(12) United States Patent
Stouffer et al.

(10) Patent No.: US 8,206,627 B2
(45) Date of Patent: Jun. 26, 2012

(54) SYSTEMS AND METHODS OF MAKING MOLDED COMPOSITE BLOCKS

(75) Inventors: Mark R. Stouffer, Middletown, CT (US); Richard A. Prince, Westfield, MA (US); Robert E. Astle, Middlefield, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 497 days.

(21) Appl. No.: 11/690,047

(22) Filed: Mar. 22, 2007

(65) Prior Publication Data

US 2007/0222101 A1    Sep. 27, 2007

Related U.S. Application Data

(60) Provisional application No. 60/785,397, filed on Mar. 22, 2006.

(51) Int. Cl.
  *B28B 1/08* (2006.01)
  *B28B 3/06* (2006.01)
  *B29C 43/02* (2006.01)
  *B28B 1/087* (2006.01)

(52) U.S. Cl. .......... 264/72; 264/109; 264/120; 264/294; 264/297.8

(58) Field of Classification Search .............. 264/69, 264/71, 72, 109, 120, 122, 294, 297.1, 297.8, 264/442, 443
  See application file for complete search history.

(56) References Cited

U.S. PATENT DOCUMENTS

| | | | | |
|---|---|---|---|---|
| 2,706,843 A * | 4/1955 | Davis | ............ | 264/40.4 |
| 3,767,351 A * | 10/1973 | Blaser | ............ | 425/432 |
| 3,886,088 A * | 5/1975 | DeJong | ............ | 502/423 |
| 4,061,807 A * | 12/1977 | Shaler et al. | ............ | 428/36.4 |
| 4,108,670 A * | 8/1978 | Steiger et al. | ............ | 501/96.3 |
| 4,664,683 A | 5/1987 | Degen et al. | | |
| 4,753,728 A | 6/1988 | VanderBilt et al. | | |
| 4,859,386 A | 8/1989 | VanderBilt et al. | | |
| 5,017,318 A | 5/1991 | VanderBilt et al. | | |
| 5,094,736 A | 3/1992 | Greenbank | | |
| 5,205,684 A * | 4/1993 | Meskin et al. | ............ | 408/145 |
| 5,505,892 A * | 4/1996 | Domme | ............ | 264/29.6 |
| 5,531,260 A * | 7/1996 | Burke | ............ | 164/97 |

(Continued)

FOREIGN PATENT DOCUMENTS

DE    3903640 A  *  8/1989

(Continued)

OTHER PUBLICATIONS

"Forming Techniques for the Self-Reliant Potter," 1991.*

(Continued)

*Primary Examiner* — Joseph Del Sole
*Assistant Examiner* — Ryan Ochylski

(57) ABSTRACT

Provided are filtration matrixes formed from adsorptive media, such as activated carbon, and polymeric binder for use in water filtration systems. A first aspect of the invention provides methods of making a filtration matrix comprising: mixing an adsorptive media with a polymeric binder to form a mixture; impulse filling a mold with the mixture; and processing the mixture to form the filtration matrix. Filtration matrixes formed from this method are also provided. Another aspect includes methods of making a filtration matrix comprising: mixing adsorptive media with a polymeric binder to form a mixture; filling a mold with the mixture; and applying heat and pressure the mixture to form the filtration matrix, wherein the step of applying pressure to the mixture comprises compressing the mixture until a desired final shape of the filtration matrix is obtained.

18 Claims, 1 Drawing Sheet

U.S. PATENT DOCUMENTS

| | | | | |
|---|---|---|---|---|
| 5,593,626 | A * | 1/1997 | Yagishita | 264/122 |
| 5,607,595 | A | 3/1997 | Hiasa et al. | |
| 5,672,363 | A * | 9/1997 | Sagawa et al. | 425/3 |
| 5,678,241 | A * | 10/1997 | Wilson et al. | 588/19 |
| 5,725,816 | A * | 3/1998 | Sagawa et al. | 264/102 |
| 5,840,348 | A * | 11/1998 | Heiligman | 425/407 |
| 6,231,796 | B1 * | 5/2001 | Allen | 264/72 |
| 6,558,593 | B2 * | 5/2003 | Cassani | 264/69 |
| 6,670,736 | B2 | 12/2003 | Horng et al. | |
| 6,682,667 | B1 * | 1/2004 | Matviya | 264/29.4 |
| 6,770,736 | B1 | 8/2004 | Haftka et al. | |
| 6,793,866 | B2 | 9/2004 | Kelly et al. | |
| 6,998,080 | B2 * | 2/2006 | Stadermann et al. | 264/122 |
| 7,112,280 | B2 | 9/2006 | Hughes et al. | |
| 2002/0044985 | A1 * | 4/2002 | Nordell et al. | 425/352 |
| 2003/0015813 | A1 * | 1/2003 | Rau et al. | 264/40.1 |
| 2003/0089237 | A1 | 5/2003 | Jagtoyen et al. | |
| 2004/0040906 | A1 | 3/2004 | Jagtoyen et al. | |
| 2004/0168974 | A1 * | 9/2004 | Hughes et al. | 210/502.1 |
| 2005/0012231 | A1 * | 1/2005 | Olsson et al. | 264/19 |
| 2005/0121387 | A1 | 6/2005 | Kuennen et al. | |
| 2005/0123879 | A1 * | 6/2005 | Andersson et al. | 433/174 |
| 2005/0263453 | A1 * | 12/2005 | Collias et al. | 210/501 |
| 2005/0269729 | A1 * | 12/2005 | Holthausen et al. | 264/109 |
| 2007/0222101 | A1 | 9/2007 | Stouffer et al. | |

FOREIGN PATENT DOCUMENTS

| | | |
|---|---|---|
| EP | 00657388 | 6/1995 |
| EP | 0661094 | 7/1995 |
| JP | 03254883 | 11/1991 |
| JP | 7215711 | 8/1995 |
| JP | 08337412 | 12/1996 |
| JP | 10244253 | 9/1998 |
| JP | 11047733 | 2/1999 |
| JP | 11104623 | 4/1999 |
| JP | 00256999 | 9/2000 |
| JP | 2000-281325 | 10/2000 |
| JP | 2000313610 | 11/2000 |
| JP | 2000351613 | 11/2000 |
| JP | 01000859 | 1/2001 |
| JP | 20011205253 | 7/2001 |
| JP | 02012417 | 1/2002 |
| JP | 2002029722 | 1/2002 |
| JP | 02137911 | 5/2002 |
| JP | 2003-334543 | 11/2003 |
| JP | 05013883 | 1/2005 |
| SU | 392036 A * | 12/1973 |

OTHER PUBLICATIONS

Faust, S.D., et al., Chemistry of Water Treatment, $2^{nd}$ Ed. Ann Arbor Press, Chelsea, MI (1998) pp. 131-133.

Miura et al., Production of high density activated carbon fiber by a hot briquetting method, Carbon, vol. 38 (2000) pp. 119-125.

Millipore, "BET", available at http://www.millipore.com/membrane/mrc3/bet, accessed Sep. 17, 2009.

* cited by examiner

SYSTEMS AND METHODS OF MAKING MOLDED COMPOSITE BLOCKS

CROSS-REFERENCE TO RELATED APPLICATIONS

This application claims the benefit of priority under 35 U.S.C. §119(e) to U.S. Provisional Application No. 60/785,397, filed Mar. 22, 2006, the disclosure of which is hereby incorporated by reference in its entirety.

TECHNICAL FIELD

The present disclosure relates to molded composite blocks and methods of making molded composite blocks, for example, filtration matrixes. More specifically, provided are filtration matrixes formed from adsorptive media, such as activated carbon, and polymeric binder for use in water filtration systems.

BACKGROUND

Composite blocks of adsorptive material, such as adsorbent activated carbon, and polymeric binders, such as ultra high molecular weight polyethylene (UHMW PE), are useful in water filter technology. Carbon block technology, for example, provides comparable functionality to loose bed carbon particles, for example, removal of organic contaminants from water, without the mess or taking up too much space.

In U.S. Pat. No. 7,112,280 to Hughes et al., "gas porous polymer filters and methods of use" are provided. Hughes et al. discusses a method of processing that "involves the vigorous vibration of powdered filter material and polymer until they are firmly compacted into a given space such as a mold cavity. Pockets of air creating unnecessary voids between the particles are reduced in this manner. This achieves the maximum amount of density of materials without external force." However, vibration can cause fluidization of fine powders, so powders may not fill the mold to the maximum possible density. Vibration has been shown to be highly variable and difficult to control, so that mold filling utilizing vibration is difficult to consistently reproduce. For high levels of fluidization, segregation of particles by size and density can occur when using vibration. Since the Hughes et al. process uses fine media particles and does not compress the block constituents in the molds, relatively larger amounts of binder are required to form a sufficient number of point-to-point bonds to immobilize the particles, in order to produce satisfactory carbon block filters.

Bulk density of a powder varies widely with the way it has been handled. A specific powder will exhibit a maximum uncompressed density. Frequently, a powder is characterized by its maximum uncompressed density because this is a reproducible value. Powders with different compositions and different particle sizes will have different maximum uncompressed density values. ASTM Methods B527, D4164, and D4781 define methods for measuring maximum uncompressed density of a powder. These methods utilize tap filling or tapping.

There is an on-going need to reduce variability in the manufacture of composite blocks, such as filter matrixes. It is also desirable to increase flow through these filters, as well as to increase their capacities for contaminants. Further, there is a need to reduce the amount of binder needed as well as to reduce the amount of scrap material produced.

SUMMARY

A first aspect of the invention provides methods of making a filtration matrix comprising: mixing an adsorptive media with a polymeric binder to form a mixture; impulse filling a mold with the mixture; and heating the mixture to form the filtration matrix. Reference to "impulse filling" means that a force is applied to the mold, causing a discrete, substantially vertical displacement that induces movement of at least a portion of the particles in the mold, causing the particles to assume a compact orientation in the mold. This includes indirect methods such as hammer blows to a table to which the molds are clamped and impacts to the table from a pneumatic cylinder, and any suitable direct methods that displace the molds with a series of jarring motions. In some embodiments, the impulse filling comprises a series of discrete displacements (i.e., impulses) applied to the mold. Impulse filling differs from vibration in that there is a period of non-movement or of little movement between the displacements. The period between displacements is typically at least 0.5 (in some embodiments, at least 1, 2, 3, 5, or even at least 10) seconds. The displacement applied to the mold has a vertical component. In some preferred embodiments, the vertical component (as opposed to the horizontal component) accounts for a majority (in some embodiments, a substantial majority (>75%), or even nearly all (>90%)) of the molds movement.

In an embodiment, the step of impulse filling comprises administering impulses at a rate in the range of 6 to 120 (in some embodiments, 10 to 90, or even 15 to 60) impulses per minute. A detailed embodiment provides that the rate is about 20 impulses per minute. Typically, it takes 2 to 5 minutes to fill a mold.

In another embodiment, the impulse filling is used to fill a plurality of molds, and thereby, form a plurality of filtration matrixes. Regarding the uniformity of the plurality of filtration matrixes, in one embodiment, a standard deviation of the average weight of the plurality of filtration matrixes is no greater than 10 (in some embodiments, 5, 4, 3, 2, or even 1) % of the average weight.

In one or more embodiments, the adsorptive media comprises activated carbon and/or a lead-removal media. Other embodiments provide that the binder comprises ultra high molecular weight polyethylene.

With reference to the mixture, a maximum uncompressed density can be obtained through methods known in the art, such as ASTM Methods B527, D4164, and D4781. In one embodiment, the mold is filled to at least 90% of the maximum uncompressed density. In another embodiment, the mold is filled to at least 95% of the maximum uncompressed density. Because the maximum uncompressed density is reproducible, filling molds to near the maximum uncompressed density reduces filter variability.

In one or more embodiments, the processing step comprises compressing the mixture until a desired final shape of the filtration matrix is obtained. In this way, generation of scrap material can be reduced to practically zero.

Yet another embodiment provides that the processing step comprises heating the mold to a temperature in the range of 160° C. to 220° C.

In a further embodiment, a mold that is tapered is provided to facilitate removal of the filtration matrix from the mold.

Another aspect of the invention includes methods of making a filtration matrix comprising: mixing an adsorptive media with a polymeric binder to form a mixture; filling a mold with the mixture; and applying heat and pressure the mixture to form the filtration matrix, wherein the step of applying pressure to the mixture comprises compressing the mixture until a desired final shape of the filtration matrix is obtained.

In one embodiment, the steps of applying heat and pressure are done substantially simultaneously. In another embodiment, the step of applying heat occurs before the step of applying pressure.

In a detailed embodiment, the step of applying pressure comprises applying compressive force axially to the mixture.

Another embodiment further comprises providing a mold that is tapered to facilitate removal of the filtration matrix from the mold.

Another aspect of the invention is a filtration matrix made according to the method of mixing an adsorptive media with a polymeric binder to form a mixture; impulse filling a mold with the mixture; and processing the mixture to form the filtration matrix. In one embodiment, the binder is present in an amount of no greater than 30 (in some embodiments, 25, 20, 15, 14, 13, 12, 11, or even 10) % or less of the total weight of the matrix. In some embodiments, the filtration matrix has a VOC capacity according to NSF-53 of at least 20 (in some embodiment, 30, or even 40) gal/in$^3$ or greater.

A further aspect of the invention is a method of making a filtration matrix comprising: mixing an adsorptive media with ultra high molecular weight polyethylene to form a mixture comprising the adsorptive media in an amount in the range of 65 to 90% by weight and ultra high molecular weight polyethylene in an amount in the range of 35 to 10% by weight; impulse filling a mold with the mixture; heating the mold to a temperature in the range of 160° C. to 220° C.; compressing the mixture until a fixed length of the filtration matrix is obtained; and cooling the mold. In one or more embodiments, the temperature range is 175° C. to 180° C.

The numerous features and advantages of the invention will become more apparent to those skilled in the art upon consideration of the remainder of the disclosure including the detailed description and claims taken in conjunction with the accompanying drawings.

BRIEF DESCRIPTION OF THE DRAWINGS

In describing embodiments of the invention, reference is made to the various Figures wherein like reference numerals indicate like features and in which.

Figure 1:
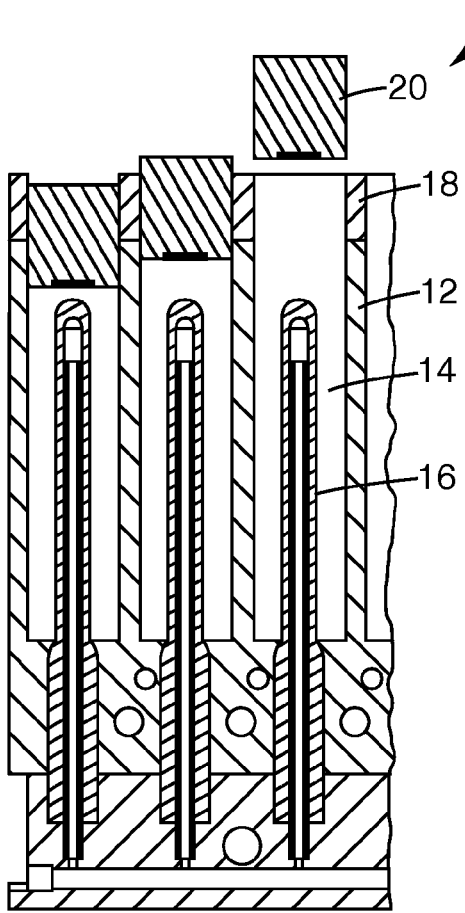
FIG. 1 is a schematic representation of a representative prior art material compressing apparatus useful with molds during the manufacture of composite blocks.

Before describing several exemplary embodiments of the invention, it is to be understood that the invention is not limited to the details of construction or process steps set forth in the following description. The invention is capable of other embodiments and of being practiced or being carried out in various ways.

DETAILED DESCRIPTION

Provided are molded composite blocks and methods of making molded composite blocks, for example, filtration matrixes. More specifically, provided are filtration matrixes formed from adsorptive media, such as activated carbon, and polymeric binder for use in water filtration systems. A first aspect of the invention provides methods of making a filtration matrix comprising: mixing an adsorptive media with a polymeric binder to form a mixture; impulse filling a mold with the mixture; and processing the mixture to form the filtration matrix. Filtration matrixes formed from this method are also provided. Another aspect includes methods of making a filtration matrix comprising: mixing adsorptive media with a polymeric binder to form a mixture; filling a mold with the mixture; and applying heat and pressure the mixture to form the filtration matrix, wherein the step of applying pressure to the mixture comprises compressing the mixture until a desired final shape of the filtration matrix is obtained.

The known prior art processes are believed to have at least several recognizable disadvantages that would be highly desirable to solve including, but not limited to: (a) significant carbon block cracking problems with some formulations, (b) a requirement for relatively high levels of polymer binders that add no functionality to the carbon block, (c) reduced service life because there is measurably less active media contained in the carbon block molded part, (d) variable block density and porosity which can cause reduced performance and variations in performance between individual carbon block parts and (e) requirement to trim carbon blocks to the proper length because the media/binder mixture in molds is compressed to different levels or settles to different levels during baking, thereby adding cost, complexity and increasing scrap rates.

As is known, very fine media particles are desired to attain cyst retentivity and optimal adsorption kinetics, and production of such powders is difficult to control to consistent particle size distributions. Therefore, it would be desirable to provide methods and composite blocks that (1) improve performance and service life of composite carbon blocks, in particular, service life for VOC, lead and cyst removal (2) reduce variation in performance among composite carbon blocks (3) simplify the production process for making composite blocks by eliminating the need to cut to final length, and (4) reduce material waste in composite block production by molding to substantially the final length within acceptable tolerances.

The following define specific terms, as they are understood to be used to the present disclosure.

Use of the term "UHMW PE" herein is intended to encompass ultra high molecular weight polyethylene having a molecular weight as described in commonly-owned U.S. Pat. No. 7,112,280, to Hughes et al., entitled "GAS POROUS POLYMER FILTER AND METHODS OF USE," the disclosure of which is herein incorporated by reference to the extent not inconsistent with the present disclosure.

The term "composite blocks" as used in this present application shall be understood to mean filter elements produced by mixing media particles with a binder to immobilize the media particles. One specific example of the term, as used in the present disclosure, includes but is not limited to, a molded carbon block used for water filtration, which may include media: any material used to remove a contaminant, for example, activated carbon, lead removal media, diatomaceous earth, antimicrobial media, silica, zeolite, alumina, ion exchangers, arsenic removal media, molecular sieves, charge modified particles, titanium silicates, titanium oxides, and metal oxides and hydroxides or any operable combination of the above.

By the terms "fluid and/or liquid," we mean any fluid and/or liquid capable of being processed through composite carbon block filters, including, not limited to, potable water, non potable water, industrial liquids and/or fluids or any liquid and/or fluid capable of being processed through a filtration apparatus.

By the term "contaminant," it is meant a substance or matter in the fluid that has a detrimental effect on the fluid or subsequent processing or use of the fluid.

By the term "separation," we mean the method by which contaminants are removed from a fluid by flowing the fluid through a porous structure.

Embodiments of molding composite carbon blocks include, but are not limited to, the following: (1) filling molds with the blend of media material and binder as closely as possible to the maximum uncompressed density without segregation of particles such that the density is substantially maximized and reproducible; thus, variability of fill is minimized (within 10% of maximum, specifically within 5%), (2) compressing the blend of media material and binder in the molds to a final shape, such as by moving a piston for a fixed distance, rather than applying a fixed pressure for a certain time; in this way, the molds do not require trimming, (3) forming blocks with controlled porosity and density, and (4) providing a tapered mold cavity to improve release of the carbon blocks from the molds, since with compression there is less shrinkage of the molded part, so extraction of the carbon block from the molds can become difficult.

These specific aspects are described in more detail below, as well as the resulting carbon blocks. These aspects can be applied individually or, more specifically, in combination, depending upon the particular requirements of any one particular application.

In one aspect of the invention, the vibration techniques used in U.S. Pat. No. 7,112,280 is replaced by impulse filling, that is, a series of discrete displacements of the mold. Vibration typically involves displacement with a frequency greater than about 600 displacements per minute, usually considerably higher. With the impulse filling method, the frequency of displacements is typically in the range 5 to 120 displacements per minute, specifically about 20 displacements per minute (every 3 seconds). The impulse filling method is a technique that results in a closer approach to the maximum uncompressed density for the powder, such as, for example, a mixture of UHMW PE and adsorptive filtration media, contained in the mold. It was found that by replacing vibration by impulse filling, higher density and less cracking was observed in the end product carbon blocks. It was also found that with impulse filling, intact carbon blocks could be produced utilizing less binder than was utilized with the prior art techniques. Further, filling by impulse filling was observed to result in less variability in the mold fill weight and less variability in the carbon block porosity and flow properties. The standard deviations in air flow resistance values and in block mass were significantly reduced, as shown in the examples.

Another aspect of the invention uses an axial compression step either during or after baking of molds. A key to this compression step is that it is controlled to compress the material to a fixed length. This has the following distinct advantages over prior art: (1) the carbon block is molded to its final shape, eliminating the need for further processing and reducing scrap; and (2) when combined with the impulse fill method described above, the carbon block density and porosity are highly uniform, leading to carbon blocks with controlled performance characteristics, such as pressure drop and performance for reducing VOC and cyst. This technique provides more control than compression at constant pressure.

In one embodiment, molds are designed with top plates having protruding cylinders that provide a fixed length of compaction. The top plate is applied before the mold cavity is heated. Initially a constant axial pressure is applied. This pressure is applied before heating and it is maintained as the mold is heated. As the polymer becomes molten, the axial pressure causes the material to compact. Compaction continues until the fixed length or distance of compaction is reached. The fixed length or distance is controlled by design of the top plate such that its movement into the mold cavity stops after reaching the final molded length. At this point, there is no pressure on the mold, although the material in the mold is constrained.

In another embodiment of this disclosure, the media-binder mixture is compressed during or after baking, while the binder is still in its molten state. Again, the distance of compaction is controlled to attain the desired final molded length.

It has been found through pilot tests and plant trials that the above process of compressing to a fixed distance applied after vibration filling of molds or after impulse tap filling of molds gives the following advantages: (1) reduced carbon block cracking; (2) higher strength carbon blocks; and (3) carbon blocks can be made with less binder and more media. Capacity and service life of the composite blocks are improved by the presence of more uniform carbon block flow properties within a batch of carbon blocks, cyst retentive carbon blocks without the need for ultra-fine media particles, molded carbon blocks are at final specified shape/length with smooth uniform ends, and elimination of material waste.

FIG. 1 illustrates a representative prior art system for compressing material useful with molds during the manufacture of composite blocks for liquid filtration systems. As shown, the system 10 includes a mold body 12, a mold cavity 14, a mandrel 16, and an intermediate mold plate 18. A compression piston 20 functions to compress the material loaded in the mold cavity 14, as is known to those skilled in the art. In operation, the mold cavity 14 is filled with the appropriate material, the compression piston 20 is aligned with the intermediate mold plate 18 that functions as an alignment and load plate for the compression piston 20 and the compression piston 20 is advanced into the mold cavity 14 as illustrated. FIG. 1 illustrates that the compression piston 20 is capable of being moved into the mold cavity 14 as far as the amount of pressure being applied to the compression piston 20 will enable. This unrestrained, other than the pressure applied to the compression piston, distance that the compression piston 20 is allowed to travel has traditionally resulted in an unacceptable variance in the length of the composite blocks produced thereby.

Figure 2:
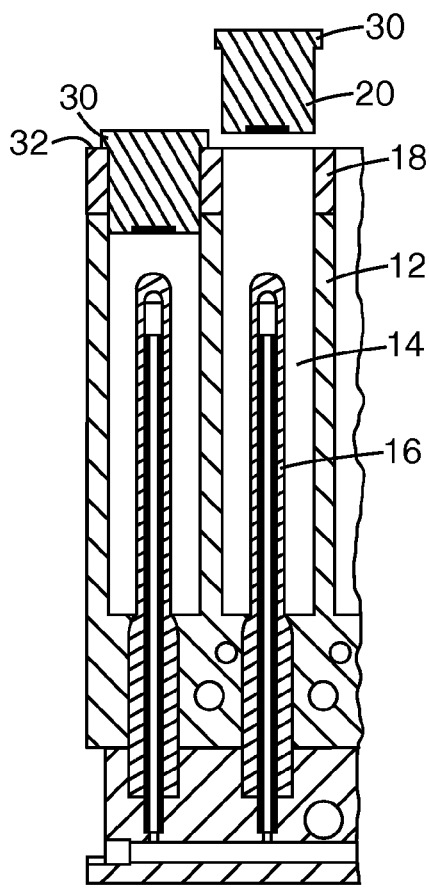
FIG. 2 is a schematic representation of a representative material compressing apparatus useful with molds during the manufacture of composite blocks in accordance with the present disclosure.

FIG. 2 illustrates one representative example for restricting the distance that the piston travels into the mold. As shown, one possible technique is the addition of a tabbed structure 30 that is operatively positioned on the compression piston 20 such that the distance to the compression piston 20 can travel inside the mold cavity 14 is restricted by the interface of the tabbed structure 30 and the top surface 32 of the intermediate plate 18. It should be understood that there are variety of structures that could be employed by persons skilled in the art to accomplish this end result. The specific location of the tabbed structure 30 is not considered to be critical to the present disclosure and the inventors of the present disclosure believe that any structure that resulted in the control limited movement of the compression piston into the mold cavity is encompassed in the present disclosure. In addition, structures other than the piston could be altered to achieve the fixed length compression. For example, the platen that moves the compression cylinders could be configured to move a fixed distance, by methods that would be known to those skilled in the art.

FIGS. 1 and 2 compare the method of compression of this disclosure to the prior art (compression by a constant pressure). A variety of mold designs can be used for fixed length compression. FIG. 2 shows a multi-cavity mold. Trials of this concept in Monterrey, Mexico used a 64-cavity mold. The mold had an intermediate plate to prevent loss of material during initial compression. The top plate had 64 individual compression cylinders that fit into the mold cavities. Final part length was controlled by fixing the length of the compression cylinders and by applying sufficient force to close the top plate on the mold.

In a specific aspect of the disclosure, molds are filled to a reproducible maximum uncompressed density, for example, by impulse filling. Then the molds are heated and compacted by a fixed axial distance. This provides carbon blocks with the most uniform density and porosity It has been determined that blocks made with impulse filling have better uniformity within a single block, better uniformity between blocks within a lot, and better uniformity between blocks from different lots. Carbon blocks that are uniform across their length have better flow properties and filtration performance, being less susceptible to preferential flow. Further, molding blocks with uniform density across their length allows longer blocks to be molded and it allows blocks to be cut from longer sections as a cost savings measure. Improved uniformity of density and porosity between blocks within a lot and between blocks from different lots reduces product variability and improves manufacturing capability.

In a specific embodiment of the present disclosure, tapered molds are employed when carbon blocks are axially compressed. It was found that when molds are subjected to axial compression, shrinkage of the material away from the walls of the mold during cooling was reduced. This decreased shrinkage resulted in an increase in the force required to remove the carbon blocks from the molds. This increased force would most likely require appropriate modifications to the process equipment in order to easily remove the carbon blocks upon the completion of the manufacturing process. This increased force may also lead to mold damage during the carbon block ejection process. Further, it is presently believed possible that the ejection process could cause unacceptable damage to the carbon blocks, if excessive force were used. To address these problems, in accordance with the subject disclosure, the process may utilize a mold that is slightly tapered in the axial dimension, such as, for example, a taper machined into the mold cavity of between about ½ to about 1 degree, resulting in a wider diameter at the top of the carbon block than at the bottom thereof. The above described concept was applied in plant trials in Monterrey MX, Jan. 16-20, 2006. Utilizing a taper of about 0.8 degrees or about 1 degree over about 25% of the carbon block length, carbon blocks formed with axial compression were removed with substantially less force, when compared to carbon blocks formed in non-tapered molds. Thus, it was determined that it was possible to use existing equipment for ejecting carbon blocks from these molds, as opposed to making modifications to the existing equipment. Tapered molds provide one way to facilitate removal of a block from a mold. Other options including mold ejection with higher force, the use of highly polished molds, or the use of a coating that noticeably reduces the force required to eject the blocks.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

EXAMPLES

TABLE 1

Glossary

| Designation | Description | Availability |
| --- | --- | --- |
| Wood based Carbon | 325 mesh Activated Carbon | CECA Specialty Chemicals, Paris, France |
| "TICONA GUR 2126" | Ultra High Molecular Weight Polyethylene | Ticona Engineering Polymers, Winona, Minnesota |
| "TICONA GUR 4150-3" | Ultra High Molecular Weight Polyethylene | Ticona Engineering Polymers |
| "KURARAY YPG25" | Activated Carbon | Kuraray Chemical Co., Osaka City, Japan |
| "KURARAY PGW-20MD" | Activated Carbon | Kuraray Chemical Co. |
| "KURARAY PGW-100MD" | Activated Carbon | Kuraray Chemical Co. |
| "KURARAY PGW-100MP" | Activated Carbon | Kuraray Chemical Co. |
| "KURARAY YPG90" | Activated Carbon | Kuraray Chemical Co. |
| "KURARAY CG 80 × 325" | Activated Carbon | Kuraray Chemical Co. |
| "CALGON 3163" | Activated Carbon | Calgon Carbon Corporation, Pittsburgh, Pennsylvania |
| "CALGON 3164" | Activated Carbon | |
| "PICA NC506" | Activated Carbon | PICA Activated Carbon, Columbus, Ohio |
| "PACCO HMM" | Activated Carbon | Pacific Activated Carbon, Warrendale, Pennsylvania |
| "PICA GX203" | Activated Carbon | PICA Activated Carbon, |
| "ENGELHARD ATS" | Ceramic cation exchanger | BASF Catalysts, Iselin, New Jersey |

Comparative Example C1

The following formulation: Wood based carbon (35%), "TICONA GUR 2126" (43%), "TICONA GUR 4150-3" (22%), totaling 1200 grams, was charged to a container and mixed (about 600 rpm) using a drill press fitted with a paint mixing paddle. The resulting mixture was added to 8 molds secured to the table (aluminum pipe with top and bottom plate and mandrel), while vibrating, using a vibration table and an electric vibrator (Model US400 Available from Vibco, Wyoming, Rhode Island). The molds were then heated to about 180° C. in a convection oven (available from Blue M, White Deer, Pa.) for about 2 hours. The molds were cooled to room temperature and the resulting carbon blocks were ejected from the molds. Weights of the cooled carbon block varied from 60.1 to 68.5 grams (average weight=64.3 grams). All 8 of the resulting carbon blocks exhibited major cracking.

Example 1

The procedure described in Comparative Example C1 was followed with the exception that the molds, secured to the filling table, were filled while the molds were subjected to vertical displacements of the filling table by rapping the table with a hammer. Hammer blows were applied on the top of the table approximately every 2 seconds for about three minutes, until the mold was completely filled. Carbon blocks produced had weights ranging from about 73.1 to about 77.0 grams (average weight=75.0 grams). All of the resulting carbon blocks were intact with no apparent cracking. The carbon blocks were then made into water filters by gluing end caps on the carbon blocks and inserting the end capped blocks into housings. The filters were tested for air pressure drop. This is the pressure drop that occurs when 25 liter/min of air at 25° C. is passed through the carbon block, from the outside to the inside of the filter. The air pressure drop at 25 liter/min ranged from about 31.8 to about 36.9 inches water, which indicates very consistent carbon block porosity. Methods of making a carbon block of Example 1 resulted in about a 16% higher density, than the carbon blocks made using the method of Comparative Example C1, using the average weights of each example.

Comparative Example C2

The procedure described in Comparative Example C1 was followed with the exception that end-of-tap water filters were made by gluing end caps on the carbon blocks and inserting the end capped blocks into housings, using the following formulation: "KURARAY YPG25" (30%), "PICA GX203" (16%), "TICONA GUR 2126" (14%), "TICONA GUR 4150-3" (34%) and "ENGELHARD ATS" (6%), totaling about 5000 grams. Seventy-five percent (75%) of carbon blocks tested passed NSF 53 testing for cryptosporidium reduction. The NSF 53 service life for VOC removal was 130 gal.

Example 2

The procedure described in Comparative Example C2 was followed with the exception that the formulation: "KURARAY YPG90" (25%), "KURARAY YPG25" (45%), "TICONA GUR 2126" (12.5%), "TICONA GUR 4150-3" (12.5%) and "ENGELHARD ATS" (5%), totaling about 1800 grams and using vertical displacements of the filling table as described in Example 1. One hundred percent (100%) of the carbon blocks tested passed NSF 53 testing for cryptosporidium reduction The NSF 53 service life for VOC removal was over 200 gallons (non-detect VOC in the effluent at 200 gal).

Comparative Example C3

Carbon blocks for a faucet mount, fitted with an end cap and installed in a cartridge, were made using the following formulation: "KURARAY YPG100MD" (30%), "KURARAY YPG20MD" (43%), "TICONA GUR 2126" (10%), TICONA GUR 4150-3 (10%) and "ENGELHARD ATS" (7%), totaling about 5000 grams, charged to a mixer as described in Comparative Example C2 and mixed for about 13 minutes The resulting mixture was added to molds using a vibration table comparable to that described in Comparative Example C2. The molds were heated to 350° F. (177° C.) and compressed. The compression was performed with a constant force of 31 pound force per block throughout the heat cycle using a variable distance pneumatic air cylinder capable of delivering about 2000 lbs force with an air supply of 80 psig. The block was not compressed to a fixed length. After heating and compression, the molds were cooled to about 100° F. (38° C.) using water and the carbon blocks were ejected from the molds. The resulting molded carbon block lengths for a batch of 48 carbon blocks produced resulted in a mean length of 5.426 inches (13.78 cm), maximum length of 5.470 inches (13.89 cm), minimum length of 5.310 inches (13.49) with a standard deviation of the length of 0.049. If necessary, the carbon blocks were trimmed to a length of 5.32 inches (13.51 cm).

Comparative Example C4

Sixty-four carbon blocks were made using the same formulation as Comparative Example C3, with the exception that the molds were not compressed during the heat cycle. The resulting carbon blocks had an average length of 5.721 inches (14.53 cm). The carbon blocks were trimmed to the length of 5.32 inches (13.51 cm).

Example 3

Sixty-four carbon blocks were made using the same formulation as Comparative Example C3 with the exception that the molds were compressed at a fixed distance of 0.550 inches (1.4 cm) during the heat cycle. The compressive force varied over time during baking. The fixed length compression was accomplished using a tabbed piston 30. The resulting molded carbon block lengths for a batch of 64 carbon blocks produced resulted with a mean length of 5.321 inches (13.52 cm), maximum length of 5.328 inches (13.53 cm), minimum length of 5.316 inches (13.50) with a standard deviation of the length of 0.004. The molded carbon blocks were used without trimming.

Example 4

Sixty-four (64) carbon blocks for a faucet mount application were made using the procedure described in Example 1 with the exception that the following formulation: "YPG 100MD" (30%), "YPG 20MD" (43%), "TICONA GUR 2126" (10%) "TICONA GUR 4150-3" (10%) and "ENGELHARD ATS" (7%), totaling about 5000 grams, was used. This mixture was added to molds by vertical displacement filling. The molds were heated to 350° F. (177° C.) and compressed to a fixed length of 5.4 inches (13.7 cm). The resulting carbon blocks had weights ranging from 68.2 grams to 70.1 grams with a mean weight of 69.3 grams and a relative standard deviation of 1.2%. The carbon block air flow resistances (pressure drops), measured as described above, ranged from about 55 to about 63 inches of water with a mean value of 60.3 and a relative standard deviation of 5.5%. One hundred percent (100%) of the carbon blocks tested passed NSF 53 testing for cryptosporidium reduction. No detectable particles were measured in the effluent throughout the tests. The carbon blocks showed excellent VOC performance (<2 ppb breakthrough after the 50 gal test).

Comparative Example C5

Carbon blocks for a faucet mount application were made following the procedure described in Comparative Example C4 with the exception that the following formulation: "PICA GX203" (14%), "KURARAY YPH 20 MD" (31%), "TICONA GUR 2126" (15%), "TICONA GUR 4150-3" (33%) and "ENGELHARD ATS", (7%), totaling about 5000 grams, was used. Air flow resistances, as described above, of the carbon blocks ranged from about 45 to about 54 in. $H_2O$ (mean=48.8, relative standard deviation=8.0%. A representative block from this batch failed testing for NSF cryptosporidium removal. Another representative carbon block passed VOC removal testing. The effluent, after about 50 gal, was marginal indicating poor process capability (about 9.4 ppb breakthrough compared to about 15 ppb maximum allowable).

Activated Carbon

Table 2 lists several activated carbons with bulk density and BET Surface area data.

TABLE 2

| Activated Carbon | Bulk Density g/cc | BET Surface Area, $m^2/g$ |
| --- | --- | --- |
| "CALGON 3164" | 0.37 | 1247 |
| "PICA GX 203" | 0.49 | 1180 |
| "CALGON 3163" | 0.54 | >1100* |
| "PICA NC 506" | 0.51 | >1100* |
| "KURARAY PGW-100" and "KURARAY PGW-20" | 0.59 | 518 |

*These values are from manufacturer's specifications, all others are measured.

The following table summarizes VOC capacity for home water filter blocks using the activated carbons as listed in Table 3.

TABLE 3

| | Activated Carbon | Filter | Service Life for VOC[1] per unit filter volume |
| --- | --- | --- | --- |
| Comp. Ex. C6 | "CALGON 3164" | Faucet mount* | 9 gal treated per $in^3$ |
| Comp. Ex. C7 | "CALGON 3163" | Refrigerator filter (Kenmore Advanced Part No. T1RFKB1) | 11 gal treated per $in^3$ |
| Comp. Ex. C8 | "PICA GX 203"/"CALGON 3163" blend | Faucet mount* | 15 gal treated per $in^3$ |
| Comp. Ex. C9 | "PICA GX 203" | Faucet mount* | 8 gal treated per $in^3$ |
| Ex 5 | "KURARAY PGW-100" and "KURARAY PGW-20" | Faucet mount* | 48 gal treated per $in^3$ |

*Made according to the procedure described in Example C1 with noted activated carbon(s).
[1]VOC (volatile organic compound) capacity is that measured according to NSF 53 (Drinking Water Treatment Units - Health Effects).

A VOC life per NSF 53 VOC test with $CHCl_3$ surrogate involves challenging a water filter with about 300 ppb chloroform in the test water. The service life of the water filter is measured by the gallons of water treated to an effluent concentration of less than 15 ppb, as explained in a publicly available National Sanitation Foundation (NSF) document in ANSI/NSF Standard 53. Table 3 shows that the VOC capacity of carbon block water filters (per unit volume) made with the carbon of the present disclosure is about 3× to about 6× greater than that of water filters made with standard commercially available activated carbon.

Example 6

The composite carbon blocks for Example 6 were prepared following the procedure described in Comparative Example C3, with the exception that the following formulation: "KURARAY PGW-100" (30%), "PGW-20" (43%), "ENGELHARD ATS" (7%), "TICONA GUR 2126" (10%) and "ICONA GUR 4150-3" (10%), totaling about 5000 g, was used. One hundred twenty-eight (128) blocks were produced and 8 representative blocks were tested for VOC service life according to NSF 53 test method. All eight (8) blocks passed the NSF 53 VOC test to the 50 gal test capacity. Effluent levels of chloroform at 50 gal ranged from about 2.1 to about 2.8 ppb. The test was continued to 70 gal and all eight (8) blocks of the first formulation passed the VOC test with effluent values ranging from about 2.2 to about 2.6 ppb. Additional blocks were tested to determine the maximum service life. In these tests the service life to about 15 ppb effluent ranged from about 120 to about 160 gallons.

Comparative Example C10

The composite carbon blocks for Comparative Example C10 were prepared following the procedure described in Comparative Example C3, with the exception that the following formulation: "PICA GX203" (7%), "PICA NC506" (55%), ENGELHARD ATS" (7%), "TICONA GUR 2126" (20%) and "TICONA GUR 4150-3" (11%), totaling 10,000 g (in two containers), was used. One hundred twenty-eight (128) blocks were produced and 8 representative blocks were tested VOC service life according to NSF 53 test method. All 8 blocks failed VOC testing at the 50 gal test volume. Effluent chloroform levels at 50 gal ranged about 16 to about 29 ppb, compared to the maximum allowable level of about 15 ppb.

The activated carbons listed in Table 4 were tested for VOC capacity in carbon blocks.

TABLE 4

| Activated Carbon | Mesh Size | Tapped density g/cc |
| --- | --- | --- |
| "KURARAY CG 80 × 325" | 80 × 325 | 0.58 |
| "CALGON 3163" | 80 × 325 | 0.54 |
| "PICA NC506" | 80 × 325 | 0.51 |
| "PACCO HMM" | 80 × 325 | 0.60 |

The procedure described in Comparative Example C1 was followed with the exception that the following general formulation was used for all composite carbon blocks produced for Examples 7 and 8 and Comparative Examples C11 and C12: activated carbon specified in Table 5 (80%) and UHMW PE ("TICONA" GUR 2126) (20%).

The resulting composite carbon blocks exhibited the following dimensions using compression after baking: OD=1.5 inches (3.8 cm), ID 0.5 inch (1.3 cm) and length=2.4 inches (6.1).

In order to compare the capacity of the composite carbon blocks, breakthrough curves were integrated to estimate the total $CHCl_3$ removed over 250 gal. Table 5 summarizes the test data for these composite carbon blocks.

TABLE 5

|  | Activated Carbon | Chloroform Removed in 250-gal Test (grams) | | |
|---|---|---|---|---|
|  |  | Test 1 | Test 2 | Average |
| Ex. 7 | "KURARAY CG 80 × 325" | 0.22 | 0.24 | 0.23 |
| Ex. 8 | "PACCO HMM" | 0.21 | 0.23 | 0.22 |
| Comp. Ex. C11 | "CALGON 3163" | 0.13 | — | 0.13 |
| Comp. Ex. C12 | "PICA NC503" | 0.15 | — | 0.15 |

The two carbons having a density of about 0.58 g/cc or greater, "KURARAY CG 80X325" and "PACCO HMM", exhibited the best performance.

Examples 9A-9N and Examples 9P-9R

Examples 9A-9N and Examples 9P-9R comprise sets of 64 carbon blocks made using the following formulation: "KURARAY PGW-20MD" (45.0), ENGELHARD ATS (7.0%), "KURARAY PGW-100MD" (10.0%), "KURARAY PGW-100 MP" (10.0%), "TICONA GUR 2126" (10.0%) and "TICONA GUR 4150-3" (18.0%). The filling station consisted of a vibration table with a pneumatic single impactor (Model 1400-SI manufactured by Cleveland Vibrator Co., Cleveland, Ohio). The impactor delivered single impulses at a frequency of one displacement every 3 seconds (20 impacts per minute). The impactor was set at a pressure of about 80 psig to deliver energy per impact of 350 ft-lbs/cm.

TABLE 6

| Data from the process experiment. | | | | |
|---|---|---|---|---|
|  | Air Flow Resistance | | Block Mass (grams) | |
|  | Average | Std. Dev | Average | Std. Dev |
| Ex. 9A | 2.57 | 0.093 | 61.5 | 0.446 |
| Ex. 9B | 2.17 | 0.095 | 60.3 | 0.459 |
| Ex. 9C | 2.06 | 0.057 | 60.2 | 0.451 |
| Ex. 9D | 2.15 | 0.091 | 60.5 | 0.512 |
| Ex. 9E | 2.04 | 0.086 | 59.6 | 0.376 |
| Ex. 9F | 2.21 | 0.081 | 59.3 | 0.383 |
| Ex. 9G | 2.12 | 0.092 | 60.0 | 0.682 |
| Ex. 9H | 1.99 | 0.082 | 59.1 | 0.473 |
| Ex. 9I | 1.82 | 0.143 | 58.7 | 0.536 |
| Ex. 9J | 1.76 | 0.063 | 58.7 | 0.440 |
| Ex. 9K | 1.88 | 0.085 | 58.9 | 0.670 |
| Ex. 9L | 1.96 | 0.080 | 59.1 | 1.013 |
| Ex. 9M | 2.11 | 0.074 | 59.6 | 0.376 |
| Ex. 9N | 1.88 | 0.134 | 58.3 | 0.592 |
| Ex. 9P | 1.78 | 0.074 | 60.5 | 0.541 |
| Ex. 9Q | 1.86 | 0.061 | 61.3 | 0.360 |
| Ex. 9R | 1.82 | 0.059 | 60.1 | 0.475 |

Comparative Example C13

Comparative Example C13 was prepared following the procedure described in Comparative Example C1, with the exception that the molds were first filled to the top with formulation, followed by vibration on a low setting (3) of the vibration table. Carbon blocks were tested for uniformity of distribution by cutting the cylindrical block into 3 equal pieces, weighing each piece, and calculating the ratio of the bottom section (section closest to the table) to the top section (section farthest from the table). Results are listed in Table 7.

Example 10

Example 10 was prepared following the procedure described in Example 1, and sections prepared as in Comparative Example C13. Results are listed in Table 7.

TABLE 7

| Carbon Block | | Mass of 60 mm section (g) | | |
|---|---|---|---|---|
|  | number | Top | Middle | Bottom |
| Example 10 | 1 | 20.1 | 20.0 | 21.7 |
|  | 2 | 21.2 | 22.0 | 22.4 |
|  | 3 | 20.5 | 20.3 | 20.5 |
|  | 4 | 20.9 | 20.8 | 20.8 |
|  | Average | 20.6 | 20.8 | 21.3 |
|  | Bottom/Top Ratio = 21.3/20.6 = 1.03 | | | |
| Comparative Example C13 | 1 | 19.5 | 18.7 | 20.0 |
|  | 2 | 19.2 | 19.4 | 21.2 |
|  | 3 | 19.5 | 19.5 | 21.5 |
|  | 4 | 19.2 | 19.2 | 20.9 |
|  | Average | 19.3 | 19.2 | 20.9 |
|  | Bottom/Top Ratio = 20.9/19.3 = 1.08 | | | |

As the Bottom/Top Ratio approaches 1.00, uniformity along the length of the carbon block is improved.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method of making a filtration matrix comprising:
    mixing an adsorptive media with a polymeric binder to form a mixture, the adsorptive media comprising activated carbon suitable for the removal of contaminants from water;
    impulse filling a mold with the mixture to an uncompressed density, impulse filling comprises administering impulses at a rate in the range of 6 to 120 impulses per minute; and following impulse filling, heating and compressing the mixture to form the filtration matrix with a VOC capacity according to NSF-53 of 20 gal/in$^3$ or greater.

2. The method of claim 1, wherein the rate is about 20 impulses per minute.

3. The method of claim 1, wherein the mixture has a maximum uncompressed density, and the mixture after the mold is filled is at least 90% of the maximum uncompressed density.

4. The method of claim 3, wherein the mixture after the mold is filled is at least 95% of the maximum uncompressed density.

5. The method of claim 1, wherein heating comprises heating the mold to a temperature in the range of 160° C. to 250° C.

6. The method of claim 1, further comprising providing a mold that is tapered to facilitate removal of the filtration matrix from the mold.

7. The method of claim 1, wherein the adsorptive media further comprises a lead-removal media.

8. The method of claim 1, wherein the binder comprises ultra high molecular weight polyethylene.

9. The method of claim 1, wherein the impulse filling is used to fill a plurality of molds, and wherein a plurality of filtration matrixes is formed.

10. The method of claim 9, wherein a standard deviation of the average weight of the plurality of filtration matrixes is no greater than 10% of the average weight.

11. The method of claim 10, wherein the standard deviation is no greater than 5% of the average weight.

12. The method of claim 1, wherein heating and compressing are done substantially simultaneously.

13. The method of claim 1, wherein heating occurs before compressing.

14. The method of claim 1, wherein compressing occurs before heating.

15. The method of claim 1, wherein compressing comprises applying compressive force axially to the mixture.

16. The method of claim 1, wherein the impulse filling comprises an indirect force on the mold such that the table to which the mold is secured receives a force directly.

17. A method of making a filtration matrix comprising:
mixing an adsorptive media with ultra high molecular weight polyethylene to form a mixture comprising the adsorptive media in an amount in the range of 65 to 90% by weight and ultra high molecular weight polyethylene in an amount in the range of 35 to 10% by weight, the adsorptive media comprising an activated carbon suitable for the removal of contaminants from water;
impulse filling a mold with the mixture to an uncompressed density, impulse filling comprises administering impulses at a rate in the range of 6 to 120 impulses per minute;
following impulse filling, heating the mold to a temperature in the range of 160° C. to 200° C.;
compressing the mixture until a fixed length of the filtration matrix is obtained; and
cooling the mold;
wherein the filtration matrix has a VOC capacity according to NSF-53 of 20 gal/in$^3$ or greater.

18. The method of claim 17, wherein the impulse filling comprises an indirect force on the mold such that the table to which the mold is secured receives a force directly.

* * * * *